United States Patent [19]

Gummelt

[11] Patent Number: 4,727,620
[45] Date of Patent: Mar. 1, 1988

[54] RETRACTABLE CARRYING HANDLE FOR A STORAGE BATTERY

[75] Inventor: Klaus Gummelt, Garbsen, Fed. Rep. of Germany

[73] Assignee: Varta Batterie Aktiengesellschaft, Hanover, Fed. Rep. of Germany

[21] Appl. No.: 865,890

[22] Filed: May 21, 1986

[30] Foreign Application Priority Data

May 31, 1985 [DE] Fed. Rep. of Germany ....... 3519511

[51] Int. Cl.⁴ .................................................. B25G 1/04
[52] U.S. Cl. .......................................... 16/115; 16/124; 16/DIG. 15; 403/14; 403/109; 429/187
[58] Field of Search ................. 16/115, 124, DIG. 15; 294/903; 429/187; 220/94 R, 94 B; 403/13, 14, 109

[56] References Cited

U.S. PATENT DOCUMENTS

| | | | |
|---|---|---|---|
| 1,185,388 | 5/1916 | Fairchild | 403/109 X |
| 1,204,565 | 11/1916 | Habinski | 403/109 X |
| 1,639,492 | 8/1927 | Dunzweiler | 16/DIG. 15 X |
| 1,662,349 | 3/1928 | Thompson | 16/DIG. 15 X |
| 1,867,632 | 7/1932 | Roche | 294/903 X |
| 3,167,808 | 2/1965 | Lindenberg et al. | 429/187 X |

FOREIGN PATENT DOCUMENTS 1246064 8/1967 Fed. Rep. of Germany .
7712738 4/1977 Fed. Rep. of Germany .

Primary Examiner—Fred Silverberg
Attorney, Agent, or Firm—Marmorek, Guttman & Rubenstein

[57] ABSTRACT

A carrying device for a storage battery is disclosed. In one embodiment, the carrying device comprises two retractable handles attached to the storage battery and guidance members associated with said handles for guiding the movement of the handles. Each of the handles has a crosspiece and arms extending along the sides of the storage battery. The arms contain elongated slits which receive the guidance members and thereby ensure accurate guidance of the handles.

2 Claims, 1 Drawing Figure

RETRACTABLE CARRYING HANDLE FOR A STORAGE BATTERY

BACKGROUND OF THE INVENTION

This invention relates to a carrying device for a storage battery. The device has retractable handles which are integrated into the shape of the battery when they are in the storage position. When the handles are withdrawn and are in the carrying position, arms which extend from the handles along the sides of the battery are guided into position and come into contact with shaped guidance and abutment members located at the upper rim of the battery case.

While in general, bulging reinforcements of the upper case rim, usually provided on the narrow sides of a battery, offer sufficient support to the grasping hand for lifting and transporting lighter batteries, heavy battery cases usually require sturdier and more ponderous carrying devices. The common goal of such carrying devices is to arrange the handles so that when not being used, they are integrated as much as possible into the battery shape. This is desirable because such storage batteries are usually installed in closely confined spaces. The handles thus should take up a minimum of space so that the limited space available does not have to be devoted to accommodating the handles and the storage capacity of the battery need not be impaired.

Typical carrying devices for battery cases according to the above formulation are disclosed in German Gebrauchsmuster No. 77 12 738 and German patent document DE-AS No. 1 246 064. The device disclosed in the first document consists of a U-shaped wire handle having side pieces and a crosspiece connecting both side pieces. The side pieces and the crosspiece are not straight but have bends in them. The side pieces can easily be inserted and withdrawn through the bores of a carrying projection attached to the sidewalls of the battery. After the battery has been placed in the proper location, the bend in the connecting crosspiece is straightened causing the two side pieces to lay against the inside of the bore holes with a certain degree of stress. The handle thus remains more or less fixed. Because the ends of the side pieces are bent at about 90 degrees, the side pieces cannot pass entirely through the bores of the carrying projection when the wire handle is lifted.

The device disclosed in the second document mentioned is a similar wire handle, wherein the side pieces pass through open slots in a carrying projection along the front side of the battery case. The movement of the wire handle is limited by bends in the side pieces coming into contact with upper and lower stops.

There are several disadvantages to these prior art carrying devices. Because of the guidance systems which are used, there is a tendency for the handles to get stuck. This is especially true when the connecting crosspiece, which serves as the handle, pivots obliquely against the plane surface of the rim of the case. Another disadvantage of these prior art devices is that, because they are constructed from relatively thin wires and they support a great weight, they inevitably cut into the hand. A further disdvantage is their susceptibility to acid corrosion.

It is therefore an object of the present invention to provide a carrying device for batteries not having these disadvantages while still having its shape integrated into the battery shape. Such a carrying device should also be easily installable and should be subject to careful guidance when moving back and forth between carrying and resting positions.

SUMMARY OF THE INVENTION

In accordance with the present invention, a carrying device for a storage battery is provided comprising a retractable handle connected to the storage battery and at least one guidance member associated with the handle. Preferably, each battery is provided with two such handles. The retractable handle includes a crosspiece having an aperture therein for grasping the handle, and at least one arm extending from the crosspiece along the side of the battery. The arm includes at least one longitudinal slit which is adapted to closely receive the guidance member which thus serves to accurately guide the movement of the handle. The carrying device also includes a band extending along the side of the battery through which the arm of the handle passes.

In its general form, the handle in accordance with the present invention is a flat, one piece extruded part made from an artificial material, for instance polypropylene. Its upper part functions as the grasping part and includes indentations in the aperture for grasping by the hand. In a preferred embodiment, the handle is U shaped, having two arms extending along the sides of the battery and a grasping part forming a bridge for the two arms. In a further preferred embodiment of the invention, the carrying device includes a guide plate projecting outward from the side of the battery which aids in guiding the movement of the handle.

BRIEF DESCRIPTION OF THE DRAWING

A preferred embodiment of the invention is illustrated in the accompanying FIGURE.

DETAILED DESCRIPTION

Figure 1:
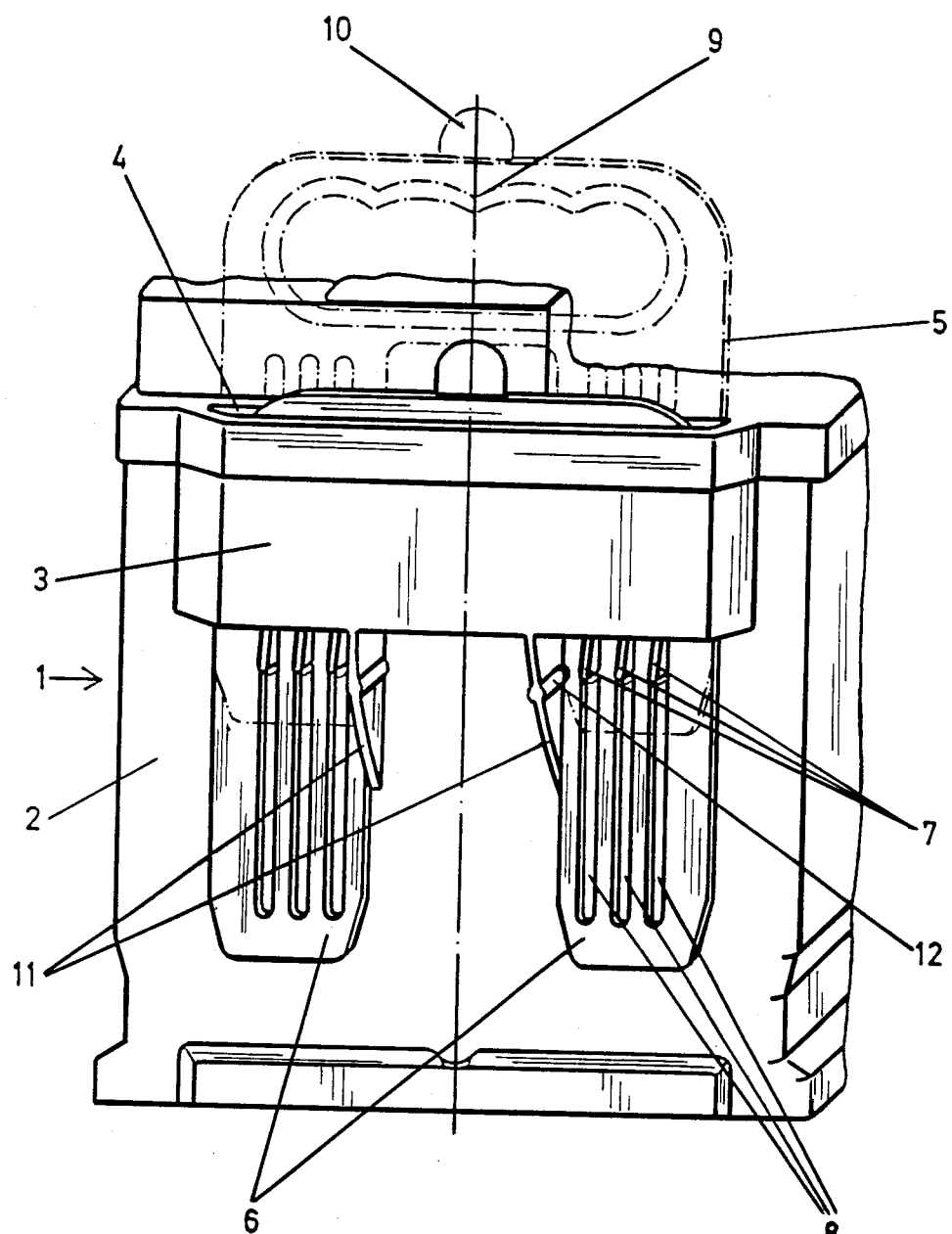

FIG. 1 shows the front side 2 of a block casing 1 for a storage battery. The present invention comprises a carrying device for the storage battery which includes a band 3 projecting from the rim of casing 1. Band 3 is shaped to conform with the rim. Band 3 extends substantially along the entire width of the block casing, and also extends downwardly along front side 2 a distance approximately equal to four times the height of the case rim.

The carrying device of the present invention also includes at least one handle 5, although preferably it has two such handles, one at each side. Band 3 has a slot 4 through which arms 6 of the handle 5 may slide directly along the front wall 2 of the block casing 1. Hammer-like guidance members 7 are provided along the wall 2 of the casing directly below the underside of band 3. Guidance members 7 are designed to fit snugly into elongated slits 8 in arms 6.

Handle 5 is made from an artificial hard material, such as polypropylene, which material is both acid resistant and provides a certain degree of flexibility. The flexibility of this material allows a limited oblique twisting of arms 6 perpendicular to the plane of slot 4. This limited twisting permits handle 5 to be initially installed on the storage battery through slot 4 with guidance members 7 becoming engaged in the elongated slits 8 of the arms 6. Guidance members 7 ensure the exact alignment of the handle 5 when it is inserted or withdrawn. The final position of the handle 5 (during non-use) is shown in the accompanying figure in solid lines.

Handle 5 can be withdrawn by means of grasping part 9 which has indentations shaped to accommodate the hand. To facilitate extraction of the handle, a projecting tongue 10 is provided. The carrying configuration is obtained when the handle is fully raised and the lower ends of the elongated slits 8, coming from below, strike the guidance members 7 that function in this instance as abutment members. This situation is shown in the accompanying figure in dot-and-dash lines.

An additional and thus especially secure guidance may be imparted to the handle 5 according of the present invention by providing guide plates 11 for arms 6. Guide plates 11 extend from the underside of the band 3 along the wall 2 of casing 1. The lateral distance between guide plates 11 can be varied within wide limits. The distance between these guide plates 11 can, for instance, be chosen so large that there is no need for separate arms 6. Instead, a single, wide arm, having guiding slits therein, can be provided between the two widely separated guide plates. Correspondingly, the guidance members 7 are then formed in the middle area of the wall 2. In this embodiment, handle 5 has an overall T-shape rather than a U-shape.

Additionally, a resting pin 12 can be provided in guide plates 11. Resting pin 12 bears against arms 6 with a certain degree of force. Resting pins 12 prevent movement of arms 6 unless a positive force is applied to withdraw handles. Thus, when handle 5 is fully inserted through slot 4, it remains in this position, even in the case of strong vibrations, until it is desired to withdraw handle 5.

The advantage of the present invention become apparent when installation of the battery into a vehicle is performed by means of robots. In such case, the robot arms must be able to reach the battery case from a variety of different approaches. In order to facilitate this, band 3 is not provided with corners but follows the shape of the rim.

Further advantages of the carrying device, according to the present invention, are derived from the material from which it is made. Acid does not adhere easily to this material. At the same time, the material, while keeping a stable shape, provides a certain degree of flexibility. This allows, for instance, the battery to be pulled out sideways from a shelf by bending the grasping part 9 obliquely over the rim of the slot 4 and then pulling.

Finally, the handle 5, according to the present invention is particularly adaptable for use in automated production lines.

While the invention has been described by reference to specific embodiments, this was for purposes of illustration only and should not be construed to limit the spirit or the scope of the invention.

I claim:

1. A carrying device for a storage battery, comprising
   at least one substantially solid and flat retractable handle connected to said storage battery, said retractable handle adaptable to be movable along a side of said storage battery,
   a plurality of guidance members associated with said handle, said guidance members projecting outward from said side of said battery, said guidance members guiding the movement of said handle,
   said handle including a crosspiece having an aperture therein for grasping said handle, and an arm extending from said crosspiece parallel to said side of said battery, said arm including a longitudinal slit therein adapted to closely receive said guidance member, said guidance member abutting against a lower end of said slit when said handle is in an extended position, said arm substantially supporting the weight of said battery when said handle is in said extended position,
   said arm comprising a plurality of longitudinal slits;
   said guidance members being received within said longitudinal slits;
   a band extending along one side of said battery, said band including a slot therein, and said arm passing through said slot; said band substantially conforming to the shape of said battery;
   said guidance members being disposed in the region of an underside of said band; and
   a guide plate projecting from said side of said battery and located adjacent said arm;
   said guide plate projecting from an underside of said band along said side of said battery.

2. The carrying device of claim 1, wherein said guide plate projects substantially perpendicularly to said side of said battery, said arm being disposed and movable along a side of said guide plate, said guide plate providing side guidance to said arm.

* * * * *